UNITED STATES PATENT OFFICE.

A. G. DAY, OF SEYMOUR, CONNECTICUT.

IMPROVEMENT IN TREATMENT OF CAOUTCHOUC.

Specification forming part of Letters Patent No. 21,122, dated August 10, 1858.

*To all whom it may concern:*

Be it known that I, AUSTIN G. DAY, of the town of Seymour, county of New Haven, and State of Connecticut, have made or invented a new and improved method of working what is usually denominated "Hard-Rubber Compounds;" and I hereby declare that the following is a full and exact description thereof.

The nature of my invention consists in a new method of heating rubber and sulphur compounds in order to make an artificial product having definite properties—namely, hardness and elasticity.

It is well known to the manufacturers of this article that Charles Goodyear, on the 15th of June, 1844, patented a mode of vulcanizing rubber to preserve it soft and flexible when exposed to the summer's sun or winter's cold, or to the action of oils or other solvents.

It is also known that Nelson Goodyear, in 1851, on the 6th day of May, patented a process of making what is usually called "hard-rubber compounds;" but which is exactly defined by the patentee calling it in his first claim "a hard and inflexible substance hitherto unknown." I call particular attention to that hard and inflexible rubber compound, because in a reissue of the same patent on the 18th day of May, 1858, the character of inflexibility then recently discovered and claimed by the patentee and considered as its chief recommendation is hardly recognized in the reissued patent of 1858; but other and different features seem to have taken its place.

My invention consists in a special mode of making a hard but highly elastic rubber compound by a process differing in the length of time, in the degree of heat, and in the proportions of the ingredients, and in the mode of equalizing the heat from that described by Nelson Goodyear in his patent of 1851.

The reissue of 1858 having changed the original character of the product, the invention itself seems entirely lost sight of in the reissue. I am therefore compelled, in order to compare my present invention with that of Nelson Goodyear of 1851, to refer to the original issue rather than the reissue for that which the patent described as the invention. This, being a definite and fixed product endued with the property of inflexibility, could not be changed, however much the manner of describing it might vary; and while Charles Goodyear discovered soft flexible vulcanized-rubber product and Nelson Goodyear discovered inflexible hard-rubber product, I have discovered a hard but elastic and flexible rubber product made by a certain specific process, which I will now proceed to describe; but before doing so, and in order that the art may be better understood and my experiments better appreciated, I will give a short statement of the general condition of the art up to the time of my experiments, and then rehearse the substance of these experiments.

The gist and scope of Charles Goodyear's experiments and results patented in June, 1844, consisted in devices for preserving the natural properties of the gum, and by adding thereto qualities of durability, so that it will withstand the test of time and heat and cold, also resist the action of the various solvents. These results were fully covered in what is called the "vulcanizing process." This process is one that has never been fully understood in all its parts until since 1850, and has never been well described in any work till the subject was investigated by Payen as late as the spring of 1852. (*Comptes Rendus*, 29 March, 1852;) and although Charles Goodyear discovered the process of vulcanizing in 1841 and patented it in 1844, yet so imperfectly was it understood at that time that even Goodyear himself could scarcely repeat his own process twice with the same result; and manufacturers using his process were of course in the same predicament. They were consequently compelled to grope their way in the dark. Sometimes the attempt to vulcanize would utterly fail, and that without any apparent cause. Sometimes an article would be perfectly vulcanized in one portion and not at all in another part. Sometimes a thin piece would be cured too much, while a thicker piece would not be cured at all. Sometimes the goods, on being removed from the heater, would appear to be well cured, yet after a few weeks' or months' exposure they would become flabby and sticky.

The efflorescence and smell of sulphur on the surface of goods were made a strong objection to the articles by the wearer, and it was naturally enough inferred by the manufacturer that too much sulphur had been used; hence the efforts to avoid the evil by using less sulphur in vulcanizing than that prescribed in the patent; but it has been found in practice that the proportions prescribed by the patentee were in fact the very best average for the soft elastic rubber, and the manufacturer, instead of attempting to remove the surplus sulphur now known to be indispensable to successful vulcanization, diminished the amount of sulphur and used too small a proportion to preserve the goods, and thus vast sums were lost to the manufacturers in damaged goods thrown back on their hands. The best results would frequently fail by repeating the same experiment without learning the cause of the failure; yet the manufacturers (still impressed with the idea that too much sulphur was used because the goods still continued to effloresce with sulphur) went on diminishing the sulphur in the compound until it was reduced to less than two per cent. of the mass, quite too small to preserve the compound from undergoing decomposition. At length the evil was suspected, and the manufacturers returned to the prescription of the patentee and removed the effloresced surplus sulphur by solvents, which do not act on the sulphur which is chemically combined with the rubber. It is now known that the effloresced sulphur was not chemically combined with rubber, and might be dissolved out.

The same kind of uncertainty, although to a less extent, has attended the hard-rubber manufacture commenced by Nelson Goodyear in 1851, and patented on the 6th of May of the same year. The patentee's working compound was one part of rubber, by weight, one-half part sulphur, and one-half part of some earthy oxide or base—as lead, lime, &c.—and the vulcanizing process that was claimed by Charles Goodyear in 1844—namely, heating the compound six hours more or less at a temperature varying from 260° to 275°. The description and claim of a hard inflexible product sufficiently fixed the bounds of the invention, so that however the description may vary the product must remain the same.

Beside the working compound described by Nelson Goodyear, he also refers to a second compound, consisting of sulphur and rubber, of which he says, in the specification: "When sulphur and rubber are used alone equal weights of each are necessary. Indeed a much less proportion of sulphur would not suffice;" but as this last compound has never been used in practice, being found too brittle, and not being vulcanizable within the limit of Charles Goodyear's prescription for vulcanizing, it is disposed of without further remark.

I took up the hard-rubber manufacture at the time of the issue of the Nelson Goodyear patent, in 1851, with one single object in view—namely, the manufacture of a hard but elastic compound. I found but one kind of rubber in the market that could be used in my experiment with any success, and that was the best Para.

I soon found that to get a tough, elastic product I must abandon the N. Goodyear compound and confine my experiments to the use of sulphur and rubber, for although the earthy base increased the facility and shortened the time, and diminished the heat necessary for vulcanizing, in the same degree did it diminish the strength and toughness of the article and the uniformity of the goodness.

The prominent obstacles in the way of the manufacture when I commenced my experiments, as I have since found, were that every kind of rubber in the market abounded in impurities, so that fine Para was the only one that I could use with any degree of success; secondly, that every degree of difference in purity required different time and temperature to vulcanize; and, thirdly, that it was almost impossible to produce a uniform vulcanization in all parts of the vulcanizing charge.

After working several years on the various crude rubbers of commerce, and having devised several ways of analyzing or separating the foreign matters from the pure rubber, so as to find a uniform article to work on, and as the preliminary step to the present invention, I perfected my process of analyzing or cleaning crude rubber, and patented the same in June, 1856, for although I succeeded occasionally in making very fair specimens of elastic hard-rubber product, the results could not be relied on as uniformly certain, and consequently the manufacture was unprofitable from the uncertainty. By this process of analysis I found the following five commercial articles contain the following percentage of impurities:

First. Para rubber contains three qualities—fine, medium, and coarse. The fine contains from eight to fifteen per cent. of moisture and dried sap. The medium contains twenty per cent. impurities; and the coarse article has thirty per cent. The fine Para is the standard of quality in the market.

Second. East India rubber, including seven to eight different varieties from as many different trees and vines, collected without regard to cleanliness or quality, filled with foreign substances, as dried sap, sand, sticks, and bark intimately blended therewith, and amounting to twenty per cent. It is softer than the Para rubber.

Third. Guayaquil, containing twenty-five to thirty-five per cent. of putrid sap, sand, bark, and sticks. It is a very hard and tough rubber, not easily cleaned.

Fourth. Carthagena rubber is very hard and tough, containing eight to twelve per cent. of dried sap, and very hard to clean.

Fifth. African rubber contains twenty-five to forty per cent. of foreign matter, mostly sap of an acid character. It is a soft and flabby article, and, if the sap be retained, on exposure to the atmosphere it is decomposed and spoiled. It comes from the west coast of Africa.

These kinds I have noticed in the order of their quality in the market. They are here noticed because by my cleaning process they are all capable of being applied to my vulcanizing process, and because they were not susceptible of such use before the cleaning process.

There is another peculiarity of crude rubber that must be known and understood by the manufacturer. It is the fact that it has a globular structure, and that it holds water to the amount of eighteen to twenty-five per cent. of its weight, and that the water, if it be not previously removed, may be the means of greatly damaging the manufacture, and has been a source of great evil to the business.

Having cleaned either of the above articles in accordance with my process patented to me in 1856, I proceed to the second step in the process—namely, the mixing of the rubber and sulphur and the proportions of sulphur used for each kind of rubber, as follows: If it be Para rubber, one pound will require about eight ounces sulphur; East India and African, one pound will require, say, eight to ten ounces sulphur. If it be Guayaquil or Carthagena rubber, one pound requires six to eight ounces of sulphur. The last two, being harder, require less, and the East Indian and African, being softer, may require more sulphur than the Para rubber. The mixture is made in the usual way known to manufacturers.

A third point respecting my improvement is that of vulcanizing thick pieces of rubber. In manufacturing the soft vulcanized rubber there is no difficulty in heating very thick masses, from the porous or spongy condition in which the goods is left; but it is far otherwise with the hard-rubber compound, whether it be the flexible elastic rubber, as that made by my process, or the inflexible kind patented by N. Goodyear. In the vulcanizing process, however performed, there is during the whole operation a constant elimination of sulphureted hydrogen and other sulphureted gases, which must have the means of escape through the pores of the articles being vulcanized. The escape of these gases from goods of soft rubber is very practicable; but from hard-rubber goods, whose pores on the surface portions are very close, if they exist at all, it is very difficult for the gases to escape, and the result has been that the mass is frequently exploded by the increased pressure from pent-up gases in the vulcanizing mass. The result of the explosion to the mass itself is the instantaneous elevation of its temperature and the absolute charring of a portion, and especially that part that was internal before the explosion. This phenomenon of explosion is also attended with other remarkable peculiarities, being sudden changes of temperature and pressure within the heater.

In consequence of the great compactness of the hard-rubber composition of sulphur and rubber only, great difficulties have been experienced in vulcanizing thick pieces, such as those of a half-inch to those of an inch in thickness; but by my present improved management of the vulcanizing-heat I am enabled to vulcanize pieces of an inch or more in thickness with great uniformity and perfection.

The fourth point involved in my improvements respects the length of time and the degree of heat necessary to vulcanize hard-rubber compounds so as to give the required elasticity. The mere fact of a given length of time to vulcanize or a given elevation of temperature, unless these elements of vulcanization are combined with the proportion of the ingredients of the composition and the kind of product made, cannot cover the merits of this invention. To vulcanize soft elastic rubber compound is one thing, and to vulcanize hard elastic rubber compound may be a very different thing. It is impossible to change the time of keeping up the heat without changing the character of the product; but the product being fixed, time, temperature, and composition must be adapted thereto. The same is true of the temperature and the same is true of the composition of matter. The resulting elastic hard rubber therefore depends, not upon any individual element of the combination, but upon the mutual action of the three, no one of which, by itself, may be new. Thus Hancock heated his soft-rubber vulcanized compound from 275° to 370°. Charles Goodyear says he run his heat from 212° to 350°; but what Hancock did in sixty minutes Goodyear did at the end of three hundred and sixty, from the fact that they worked different compositions of matter, although the result in both cases was the same.

Again, in the Nelson Goodyear or hard-rubber patent the composition, containing an earthy base combined with the sulphur and rubber, required but six hours to produce the hard-rubber compound, from the fact that the presence of the earthy oxide very much shortened the period of vulcanization; but the result was that the product was destitute of flexibility and elasticity.

In the present case, the composition being confined to rubber and sulphur, without a third ingredient, and to a proportion neither used nor described by either of the Goodyear patents, and producing a result not known when those patents were issued, the combination is a legitimate one. It is new, and therefore patentable. The ingredients, being only rubber and sulphur, required three times the length of the heating term that had ever been used before, and the result, as is evident from inspecting Nelson Goodyear's original patent of 1851, was not then alluded to by the patentee. To attain it with certainty and facility, as I am now able to do, has cost me many years of labor and expense. As stated before, I commenced with the vulcanizing process of Nelson Goodyear in the year 1851-'52; but I soon learned that with my composition his time and temperature were no guide for me, so long as I confined myself to the simple composition of rubber and sulphur. I had confined my labors to these ingredients from the commencement of my work on hard rubber. Nearly six years have been expended in efforts to perfect the process. The most formidable difficulties met by me were the uncertainty of obtaining the result (which I sometimes obtained) without being able to divine at the time the cause.

I have already stated that the three prominent obstacles to the progress of this manufacture have been found to have arisen from not knowing the difference in the result of using purified rubber and using the crude or impure article; secondly, the time and temperature could not be easily adapted to work pure and impure rubber, a different heat being required for each degree of purity in the article used; and, thirdly, the want of means to equalize the heat in every part of the charge during the vulcanization.

My cleaning process, which had required more than two years to perfect, opened to me a new field of investigation, enabling me to use the poorest as well as the best article in the market, and always to have a pure article to work upon. It was therefore until the date of my cleaning patent of the 10th of June, 1856, that I was prepared to settle upon the time and temperature necessary to a successful vulcanization of my compound. The composition and the kind of article having been fixed of a uniform character, the time and the degree of heat necessary for vulcanizing will be seen below—the results of long experience.

After suitably placing the several articles to be vulcanized within the heater, which consists of a strong iron cylinder resting on its side and calculated to resist a very heavy pressure of steam within, the steam is let on and the heat run up directly to 275° Fahrenheit, and the process finished in ten to twenty-four hours, thus:

In the first instance the articles to be vulcanized are supposed to be one-fourth of an inch thick. The heat is allowed to stand at 275° four hours; then increased to 280° two hours; then increased 290° two hours; then increased to 295° one hour; then increased to 300° half an hour; then increased to 305° half an hour. Stock five-eighths of an inch runs the heat 275° requires thirteen and a half hours. Thus the vulcanization begins at 275° for six hours; then increased to 280° for three hours; then increased to 290° for two hours; then increased 295° for two hours; then increased to 300° for half an hour. It is much more difficult and uncertain when we attempt to vulcanize thick than thin pieces, from the fact, already stated, that during the process of vulcanizing a large amount of sulphureted hydrogen and other sulphureted gases are eliminated from the body of the rubber compound. Under these circumstances, if the mass harden faster on the external portions than it does within, the confined gases within explode the mass and spoil the form, and the internal portions are partially charred, even to a greater extent than the external portions of the same piece. Stock five-eighths to one and a half inch thickness, raise heat directly to 275°, continue six to twelve hours; increase to 280°, continue four hours; increase to 285°, continue four hours; increase to 295°, continue four hours.

In second instance I do not confine the heat to 300°; but I vary, sometimes running it to 310° for the last hour but one, and 315° to 320° for the last hour or the last half-hour. I also make various changes in the length of time at the different steps of the process below 300° to adapt the heat to different kinds of stock or different degrees of vulcanization. I have also learned by experiments that the intervals or grades of heat will give a tolerable result by commencing the heat at the highest point of the scale and ending with the lowest heat of the scale, using the same intervals as before.

In third instance a plan has been used running the heat directly to 295° and retaining it there, say, twenty-four hours, or till process is finished. It has been found that with all the experience thus far obtained in the manufacture of hard-rubber compounds, if vulcanization is performed in large heaters, it is difficult, if not altogether impracticable, to vulcanize equally in every part of the heater. Articles in one portion of the heater will be done too much, while those in another part will be slack. These imperfections I have greatly obviated by establishing a system of circulation which equalizes the heat in every part of the heater. It is accomplished by means of a double-acting pump or fan, or equivalent device, which shall draw out the steam from or through one head of the cylinder and transfer the same into and through the head of the opposite end, as shown in the drawings, where A represents the heating cylinder supplied with steam for heating it up under pressure by the tube c. The articles to be vulcanized are placed within A. The circulation to equalize the temperature in all parts is made by working the pump B, or its equivalent, which draws the steam from the C end of the heater through valve a and forces it through valve b and through pipe D, whence it strikes against head F and is distributed through the perforate plate E, and so through the body of the cylinder. It is evident that a single-acting or double-acting or a rotary pump or a forcing and exhausting fan may be used for this purpose. I do not now claim any special form of apparatus, for a variety of known apparatus may be used to accomplish the effect. Even a current of steam let in at one end and forced out at the other will aid in keeping up the circulation, and so equalize the heat. The novelty consists in the making an artificial circulation in a vulcanizing apparatus irrespective of the special means.

I do not claim in the broad vulcanizing rubber or equivalent gums, and irrespective of the special process used and product made. Therefore

What I claim as my invention, and desire to secure by Letters Patent, is—

1. Running the heat for vulcanizing elastic hard-rubber compound, as set forth, through the several grades of temperature and the several intervals of time described and illustrated in the specification.

2. Making, as described, the elastic hard-rubber composition of two parts, by weight, of rubber and one part of sulphur, when such composition is made preparatory to the running of the heat through the several grades of time and temperature, as set forth in the specification.

3. Equalizing the temperature in the heating apparatus by mechanical apparatus, or by a current of steam or its equivalent, in the manner set forth.

AUSTIN G. DAY.

Witnesses:
   EDW. F. BROWN,
   L. D. GALE.